US006494086B1

(12) United States Patent
Ponti

(10) Patent No.: US 6,494,086 B1
(45) Date of Patent: Dec. 17, 2002

(54) SYSTEM FOR DETECTING THE OPERATIVE STROKES OF AN INTERNAL COMBUSTION RECIPROCATING ENGINE

(75) Inventor: Cesare Ponti, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 0 days.

(21) Appl. No.: 09/626,862

(22) Filed: Jul. 27, 2000

(30) Foreign Application Priority Data

Jul. 28, 1999 (IT) ....................................... TO99A0664

(51) Int. Cl.[7] .............................................. G01M 15/00
(52) U.S. Cl. ........................................................ 73/116
(58) Field of Search ............................... 73/116, 117.2, 73/117.3, 118.1; 340/425.5, 438, 439, 441; 701/101, 102, 110

(56) References Cited

U.S. PATENT DOCUMENTS 4,766,865 A * 8/1988 Hartel ........................ 123/476
4,924,830 A * 5/1990 Abe ...................... 123/406.65
5,056,360 A * 10/1991 Dosdall et al. ............... 73/116
5,070,727 A * 12/1991 Davis et al. .................. 73/116
5,245,968 A * 9/1993 Kolias et al.
5,267,546 A * 12/1993 Siebert et al.
5,387,253 A * 2/1995 Remboski, Jr. et al. .... 73/117.3
5,469,823 A * 11/1995 Ott et al.
5,520,152 A * 5/1996 Schoenfelder et al.
5,606,119 A * 2/1997 Wallerand et al. ......... 73/117.3
5,622,153 A * 4/1997 Ott et al.
5,813,231 A * 9/1998 Faletti et al.
5,829,412 A * 11/1998 Klatt et al.
5,860,406 A * 1/1999 Schmidt et al.
5,906,652 A * 5/1999 Remboski et al. ............ 73/116
6,016,789 A * 1/2000 Denz et al.
6,185,928 B1 * 2/2001 Wallerand et al. ......... 73/117.3
6,286,365 B1 * 9/2001 Lang et al. ................... 73/116

* cited by examiner

*Primary Examiner*—Eric S. McCall
(74) *Attorney, Agent, or Firm*—Sughrue Mion, PLLC

(57) ABSTRACT

A system for detecting the operative strokes of an internal combustion reciprocating engine (10) includes a plurality of cylinders (C1, C2, C3, C4), a crankshaft (12) and at least one camshaft (22). The system also includes first and second sensors (14, 28, 26, 30), each including one sensor (28, 30) and one wheel (14, 26), the first sensor detecting the frequency of revolution of the crankshaft (12) and the angular position of at least one cambshaft (22), respectively. The second sensor includes a phonic wheel (26) split into a number of sectors (S1, S2, S3, S4) equal to the number of cylinders (C1, C2, C3, C4) in which each sector (S1, S2, S3, S4) has a characteristic number of projections and recesses (34) which is different from those of other sectors. An electronic control unit (32) establishes the operative strokes of the cylinders (C1, C2, C3, C4) in accordance with the signals output by the first and second sensors.

3 Claims, 4 Drawing Sheets

SYSTEM FOR DETECTING THE OPERATIVE STROKES OF AN INTERNAL COMBUSTION RECIPROCATING ENGINE

BACKGROUND OF THE INVENTION

This invention relates to a system for detecting the operative strokes of an internal combustion reciprocating engine.

In electronically controlled injection engines, the electronic control unit which controls the injectors must know the stroke of each cylinder to control injection of fuel and to control ignition in the predefined instants of each operating stroke. At engine crank-up, the electronic control unit does not know which are the operating strokes of the single cylinders. Usually, in order to start the engine in the shortest possible time, during the initial crank-up phase, a certain amount of fuel is injected into all of the cylinders at the same time. In this way, however, polluting emissions of unburned hydrocarbons are created which cause problems in terms of compliance with pollution prevention standards.

SUMMARY OF THE INVENTION

This invention aims at providing a system for detecting the operating strokes of an engine which, at the time when the engine is cranked, allows to identify the operating strokes of the various cylinders in the engine in the briefest possible time to allow the engine to run in the briefest possible time in a sequential and timed fashion, that is with fuel injection made at the right time and in a sequential fashion in the various cylinders.

BRIEF DESCRIPTION OF THE DRAWINGS

This invention will be described by the following detailed descriptions with reference to the accompanying figures as non-limiting examples, whereas.

DETAILED DESCRIPTION OF THE INVENTION

Figure 1:
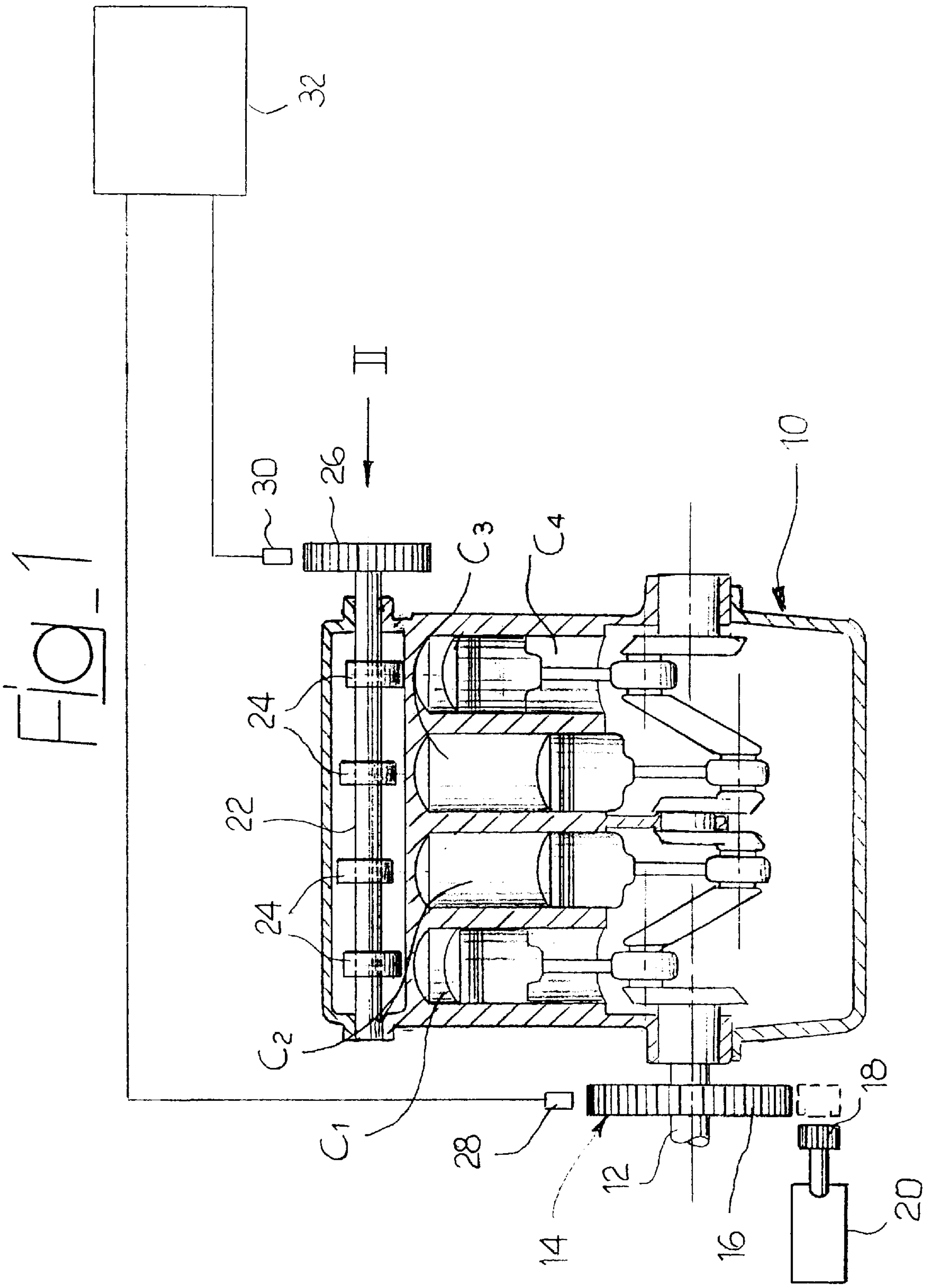
FIG. 1 is a schematic view of an internal combustion engine for motor vehicles fitting a detection system according to this invention.
Figure 2:
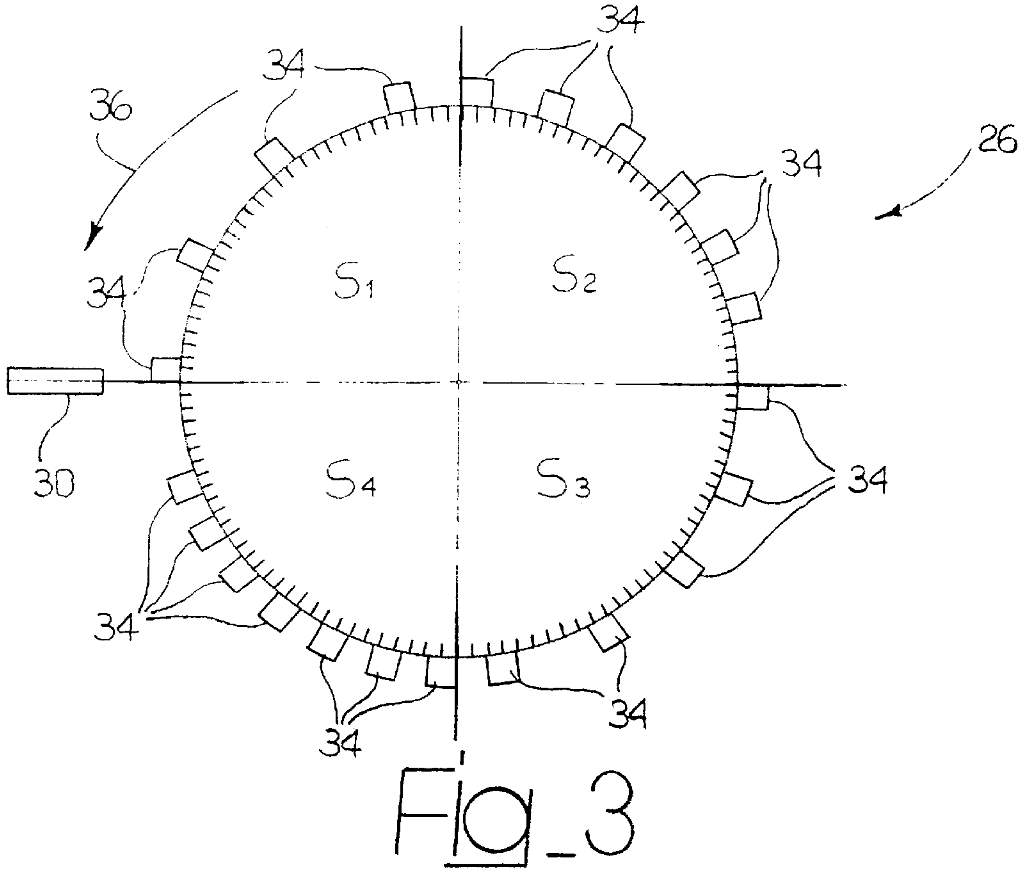
FIG. 2 is a schematic view of the phonic wheel shown by the arrow II in FIG. 1.

With reference to FIG. 1, the reference number 10 indicates an internal combustion reciprocating engine for motor vehicles, with four cylinders indicated by C1, C2, C3 and C4. The engine 10 has a crankshaft 12 onto which a flywheel 14 with an external toothing 16 is fitted, said flywheel during the explosion stroke of the engine engaging a pinion 18, said pinion being turned by a starter motor 20. Moreover, the engine 10 comprises at least one camshaft 22 equipped with cams 24 controlling the opening of the intake valves and exhaust valves (not illustrated) of engine 10. A first sensor 28 located is facing the external toothing 16 of the flywheel 14 in a stationary position; said sensor outputs an electrical signal indicating the frequency of revolution of the crankshaft 12. A second sensor 30 is located facing the outer edge of phonic wheel 26. The signals output by sensors 28, 30 are sent to a electronic control unit 32 which controls the injection of fuel via the injectors (not illustrated) associated to the respective cylinders of engine 10. With reference to FIG. 2, the phonic wheel 26 is split into a number of sectors which is equal to the number of cylinders of the engine 10, all having the same angular extension. In the illustrated example, the phonic wheel 26 has four sectors, S1, S2, S3 and S4 each with an angular extension of 90°. The wheel 26 has arranged on its outer edge a plurality of projections or recesses 34. Each sector S1, S2, S3 and S4 has a number of projections or recesses 34 which is different from the those of the other sectors. Each sector has a first section in which the projections or recesses 34 are reciprocally distanced by a constant pitch and a residual section in which the residual pitch is equal to the pitch between the projections or the recesses in the following sector. The phonic wheel 26 is fastened to the camshaft 22 in such a way that each sector S1, S2, S3 and S4 corresponds to a stroke of a respective cylinder of the engine. For example, the sectors S1, S2, S3 and S4 could be related to the stroke of cylinders C1, C2, C3 and C4, respectively. More precisely, the period of time during which the sector S1 transits in correspondence to sensor 30 during the revolution in the direction shown by the arrow 36 in FIG. 2 is exactly correlated to a precise stroke of the engine in the respective cylinder. For example, the sectors could be correlated with a compression stroke whereas the passage of each sector S1, S2, S3 and S4 in correspondence to sensor 30 indicates that the compression stroke is in progress in the respective cylinders C1, C2, C3 and C4. The projections of the recesses 34 are made in such a way that the first pitch variation inside each sector indicates that the respective cylinder has reached a dead-centre.

Figure 4:
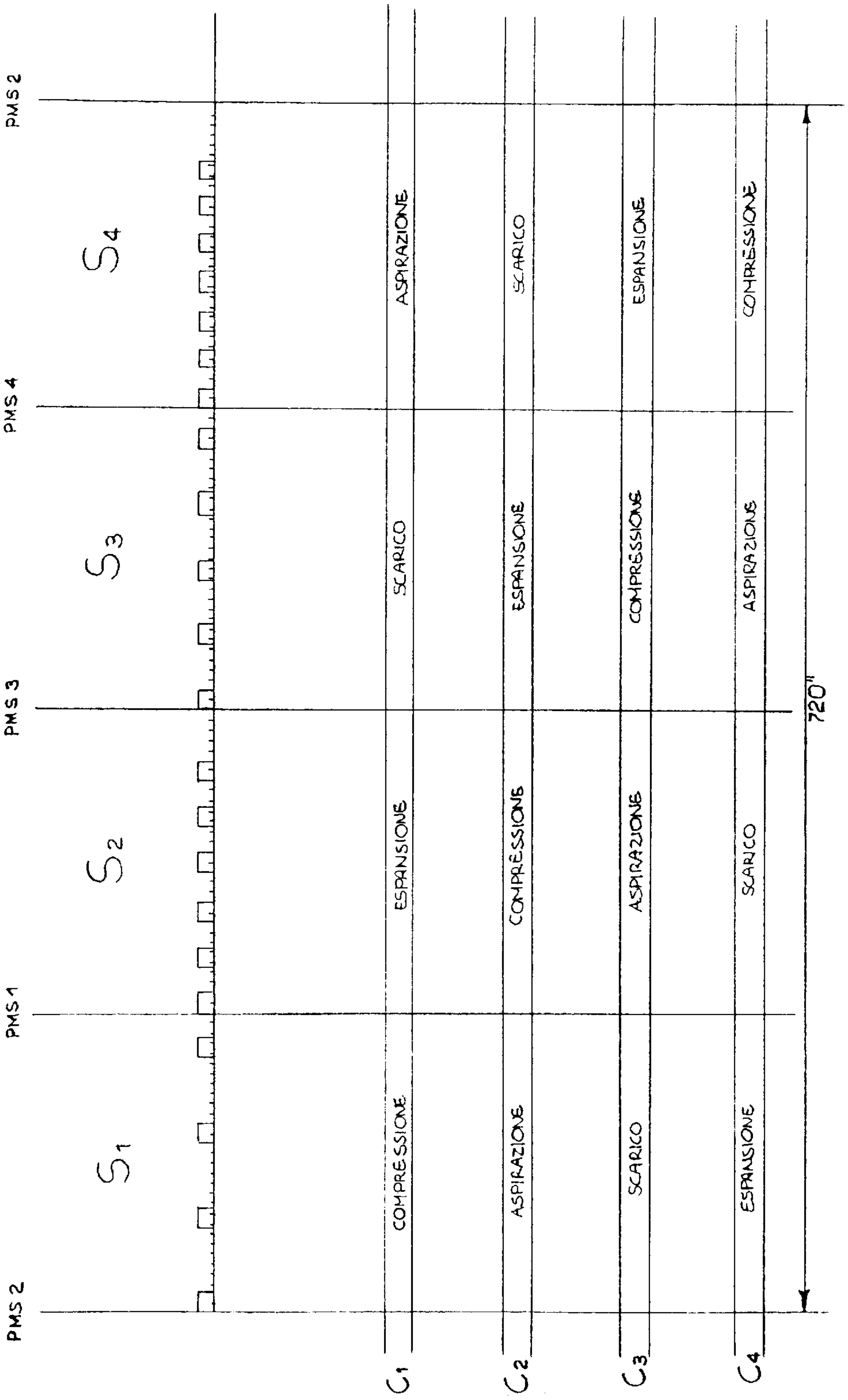

FIG. 4 schematically illustrates the plan development of the phonic wheel 26 and the relation between said phonic wheel and the strokes of cylinders C1, C2, C3 and C4. The sensor 30 associated with the phonic wheel 36 is, for example, a Hall-effect sensor which provides an electrical signal to the electronic control unit 32 indicating the frequency of passage of the projections or recesses 34. Moreover, the electronic control unit 32 receives from the sensor 28 an electrical signal indicating the frequency of passage of the teeth of the flywheel 14 in correspondence to the sensor 28. The ratio between the speed of revolution of the camshaft 22 and that of the crankshaft 12 is fixed (typically, it is equal to 1:2). Consequently, the ratio between the signal from the sensor 30 and the signal from the sensor 28 is independent from the speed of revolution of the engine and univocally identifies a sector S1, S2, S3 or S4. Consequently, the electronic control unit 32, on the basis of the ratio between the signals from the sensors 30 and 28, is able to identify which sector of the phonic wheel 26 is in correspondence to the sensor 30 and, consequently, which cylinder C1, C2, C3 and C4 is at compression stroke. Consequently, the ratio between the signals from the sensors 30 and 28 identifies the stroke of the engine and a variation of said ratio indicates the dead-centres of the cycle. Consequently, the electronic control unit 32 can control the injectors in a timed and sequential fashion, preventing the injection of fuel in cylinders which at the moment of injection are not in the currect stroke.

Figure 5:
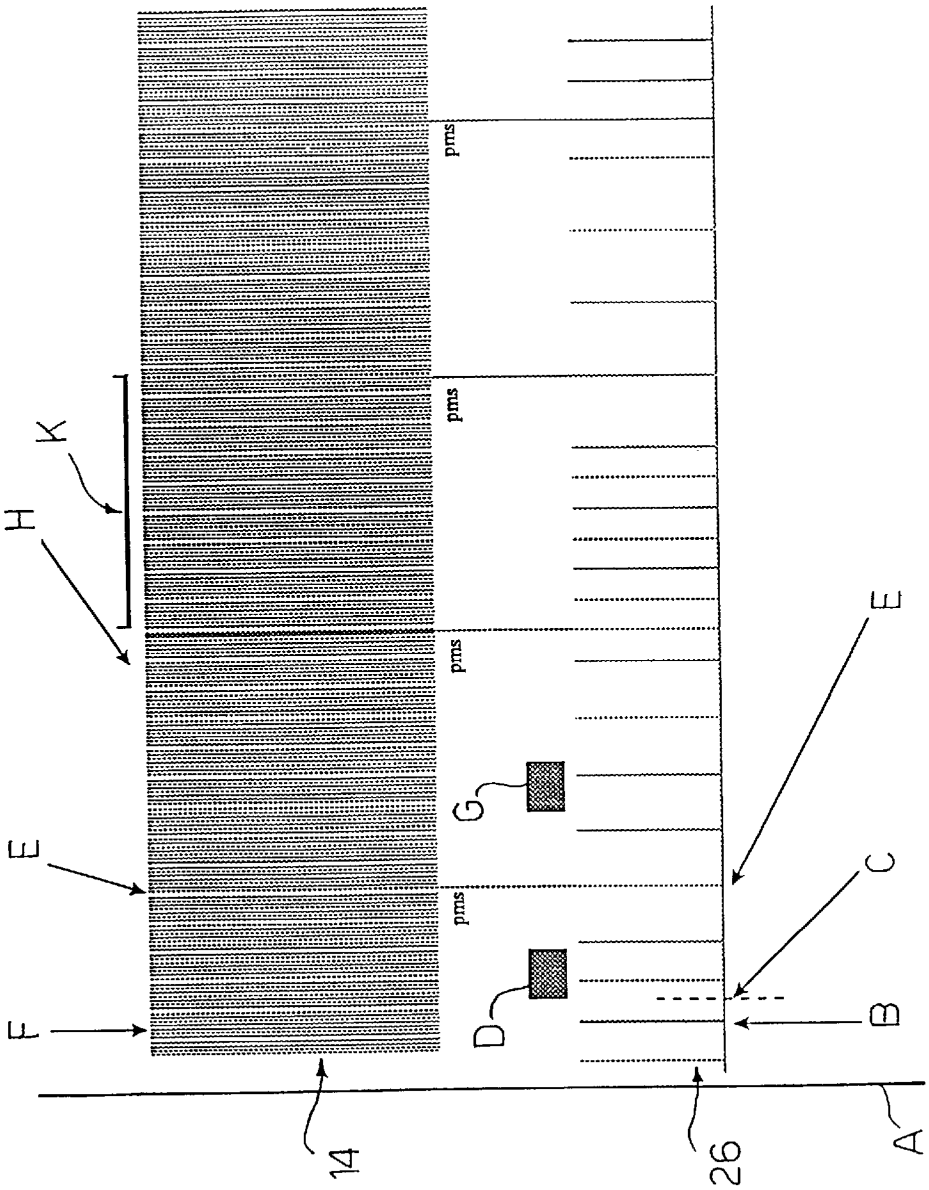

FIG. 5 schematically illustrates the sequence of strokes which occur during engine cranking. The numeral references 14 and 26 indicate the plan developments of the flywheel and the phonic wheel, respectively. The line indicated by A indicates the instant in which the engine cranking starts. In instant B, the system detects the first stroke interval and immediately after, in instant C, it detects the cylinder at suction stroke. In phase D, fuel is injected into the cylinder at suction stroke. In instant E, the sensor 30 detects the first variation of the pitch on phonic wheel 26 and recognises the top dead-centre of the cylinder where injection occurred. In the meantime, the sensor 28 associated to the flywheel 14 recognises the first three teeth of the flywheel referred to the instant F. In the instant E in which the first top dead-centre is recognised, the sensor 28 starts counting the teeth of the flywheel to prepare the spark advance. The second fuel injection in phase G is already correctly timed. Consequently, in instant H, the spark is actuated in the first cylinder and the first working spark occurs in the K interval. At this point, the engine speed increases rapidly and the timing control is exclusively carried out on the basis of the information from sensor 28 associated to the flywheel 14. In the event of lack of information from the sensor 28 (for example, due to external disturbance), correct timing can be re-established, despite it being approximate, by means of the procedure used during cranking.

The system according to this invention avoids the use of a second phonic wheel fitted on the crankshaft 12. In traditional solutions, said phonic wheel provides information on the stroke of the engine since it presents a discontinuity (generally consisting of two missing teeth) which allows a sensor to collect information concerning the stroke of the engine. The following advantages arise by detecting the frequency of engine revolution on flywheel 14 instead of on a phonic wheel:

high immunity from vibrational disturbance (the flywheel is arranged in a vibration node), lower error in teeth cutting, greater angular resolution, possibility of characterising the torque at each combustion in all engine operating points.

The system according to this invention identifies the cylinder at compression stroke within the first 90° of revolution of the engine. Moreover, the system identifies the top dead-centre of the first cylinder at compression stroke within the first 180° of revolution of the engine and allows, in the best of cases, to start the first working combustion stroke within the first 270° of the engine. In the worst of cases, the system ensures the start of combustion within the first 480° of revolution of the engine. If the sensor 28 of the engine frequency is either cut-off or disconnected, the system will ensure a recovery of the engine timing in less than 200° of revolution of the engine.

Figure 3:
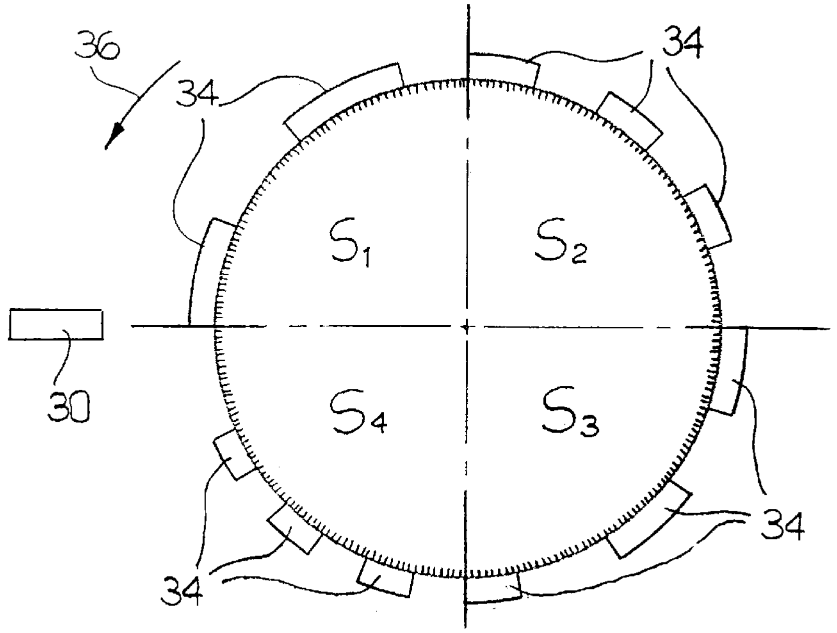
FIG. 3 is a constructive variant of the wheel shown in FIG. 2 and, FIGS. 4 and 5 are schematic diagrams showing the operation of the system according to this invention.

The detection of the projections or of the recesses 34 on behalf of a Hall-effect sensor may not be sufficiently accurate at higher ratios. To prevent this problem, a phonic wheel in the embodiment shown in FIG. 3 could be used, whereas one sensor 30 is enabled to detect the upwards ramp and the downwards ramp of each projection or recess. The embodiment in FIG. 3 allows to use a space between the teeth of the wheel which value is higher than the minimum value which can be detected by sensor 30.

Naturally, notwithstanding the concept of this invention, the construction details and the forms of embodiment can be widely modified with respect to that described and illustrated herein however within the scope of this invention, as defined by the following claims.

What is claimed is:

1. A system for detecting operative strokes of an internal combustion reciprocating engine (10) comprising a plurality of cylinders (C1, C2, C3, C4), a crankshaft (12) and at least one camshaft (22), said system comprising:

first and second sensor means (14, 28, 26, 30), each including one sensor (28, 30) and one wheel (14, 26), said means detecting frequency of revolution of the crankshaft (12) and angular position of at least one camshaft (22), respectively, and an electronic control unit (32) for establishing the operative strokes of the cylinders (C1, C2, C3, C4) in accordance with signals output by said first and second sensor means, characterized in that the second sensor means comprise a phonic wheel (26) split into a number of equal sectors (S1, S2, S3, S4) equal to the number of cylinders (C1, C2, C3, C4) in which each sector (S1, S2, S3, S4) has a characteristic number of projections or recesses (34) which is different from those of other sectors, the phonic wheel (26) being fastened to the camshaft (22) so to establish a correlation between an angular position of each sector and an operative stroke of a respective cylinder and characterized in that the electronic control unit (32) is programmed to determine the operative strokes of the cylinders in accordance to a ratio between the signals from the first and second sensor means (28, 30).

2. System according to claim 1 characterized in that the first sensor means comprise stationary position sensor (28) facing a peripheral toothing (16) of a flywheel fastened to the crankshaft (12).

3. System according to claim 1 characterized in that after cranking the engine, the system checks timing exclusively on the basis of information received from said first sensor means (28).

* * * * *